United States Patent
Eischeid

(10) Patent No.: US 10,410,648 B1
(45) Date of Patent: Sep. 10, 2019

(54) MODERATING SYSTEM RESPONSE USING STRESS CONTENT OF VOICE COMMAND

(71) Applicant: ALLSCRIPTS SOFTWARE, LLC, Chicago, IL (US)

(72) Inventor: Todd M Eischeid, Cary, NC (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 50 days.

(21) Appl. No.: 14/145,842

(22) Filed: Dec. 31, 2013

(51) Int. Cl.
*G10L 17/26* (2013.01)
*G10L 21/00* (2013.01)

(52) U.S. Cl.
CPC .................. *G10L 21/00* (2013.01)

(58) Field of Classification Search
CPC ......... G10L 17/00; G10L 15/00; G10L 15/26; G10L 21/00; G10L 17/26
USPC ................. 704/231, 270, 275, 235
See application file for complete search history.

(56) References Cited

U.S. PATENT DOCUMENTS

| | | | | |
|---|---|---|---|---|
| 6,363,346 B1 * | 3/2002 | Walters | ............... | G10L 17/26 379/112.05 |
| 7,191,134 B2 * | 3/2007 | Nunally | ............... | G10L 17/26 704/270 |
| 7,940,914 B2 * | 5/2011 | Petrushin | ............... | G10L 17/26 379/265.06 |
| 8,326,624 B2 * | 12/2012 | Jaiswal | ............... | G10L 15/26 348/468 |
| 8,693,644 B1 * | 4/2014 | Hodges, Jr. | ............... | H04M 3/5175 379/265.06 |
| 10,269,344 B2 * | 4/2019 | Lee | ............... | G10L 15/22 |
| 2003/0154120 A1 * | 8/2003 | Freishtat | ............... | G06Q 30/00 705/26.41 |
| 2005/0192649 A1 * | 9/2005 | Shehadeh | ............... | G06Q 50/22 607/60 |
| 2006/0028488 A1 * | 2/2006 | Gabay | ............... | H04L 29/06027 345/626 |
| 2007/0049363 A1 * | 3/2007 | Green | ............... | G05B 19/042 455/575.2 |
| 2007/0213988 A1 * | 9/2007 | Hanson | ............... | G06Q 10/06 704/275 |
| 2008/0114594 A1 * | 5/2008 | Forbes | ............... | G10L 15/22 704/235 |
| 2008/0184330 A1 * | 7/2008 | Lal | ............... | G06F 21/31 726/1 |

(Continued)

OTHER PUBLICATIONS

Zhou et al., "Methods for stress classification: Nonlinear TEO and linear speech based features." Acoustics, Speech, and Signal Processing, 1999. Proceedings., 1999 IEEE International Conference on. vol. 4. IEEE, 1999, pp. 2087-2090.*

(Continued)

*Primary Examiner* — Seong-Ah A Shin
(74) *Attorney, Agent, or Firm* — Loza & Loza, LLP; Peter Zura

(57) ABSTRACT

A computer implemented method for automatically moderating a system response to a user's voice command. A voice command from a user is received. The voice command is associated with a system command, the system command including command requirements. A determination is the made as to whether the user is experiencing stress based on a stress level detected in the received voice command, and the command requirements dynamically adjusted when the user is determined to be experiencing stress.

9 Claims, 1 Drawing Sheet

(56) References Cited

U.S. PATENT DOCUMENTS

| | | | | |
|---|---|---|---|---|
| 2011/0010173 A1* | 1/2011 | Scott | ................ | H04M 3/42221 |
| | | | | 704/235 |
| 2011/0125498 A1* | 5/2011 | Pickering | ................ | G10L 15/22 |
| | | | | 704/246 |
| 2011/0125503 A1* | 5/2011 | Dong | ...................... | G10L 15/22 |
| | | | | 704/275 |
| 2011/0283189 A1* | 11/2011 | McCarty | ............ | H04N 5/44543 |
| | | | | 715/707 |
| 2014/0274211 A1* | 9/2014 | Sejnoha | ............ | H04M 1/72519 |
| | | | | 455/563 |
| 2014/0315596 A1* | 10/2014 | Otto | ...................... | H04N 7/141 |
| | | | | 455/552.1 |
| 2014/0330560 A1* | 11/2014 | Venkatesha | ............. | G06F 21/32 |
| | | | | 704/235 |

OTHER PUBLICATIONS

Zhou et al., "Methods for stress classification: Nonlinear TEO and linear speech based features." Acoustics, Speech, and Signal Processing, 1999. Proceedings., 1999 IEEE International Conference on. vol. 4. IEEE, 1999.*

* cited by examiner

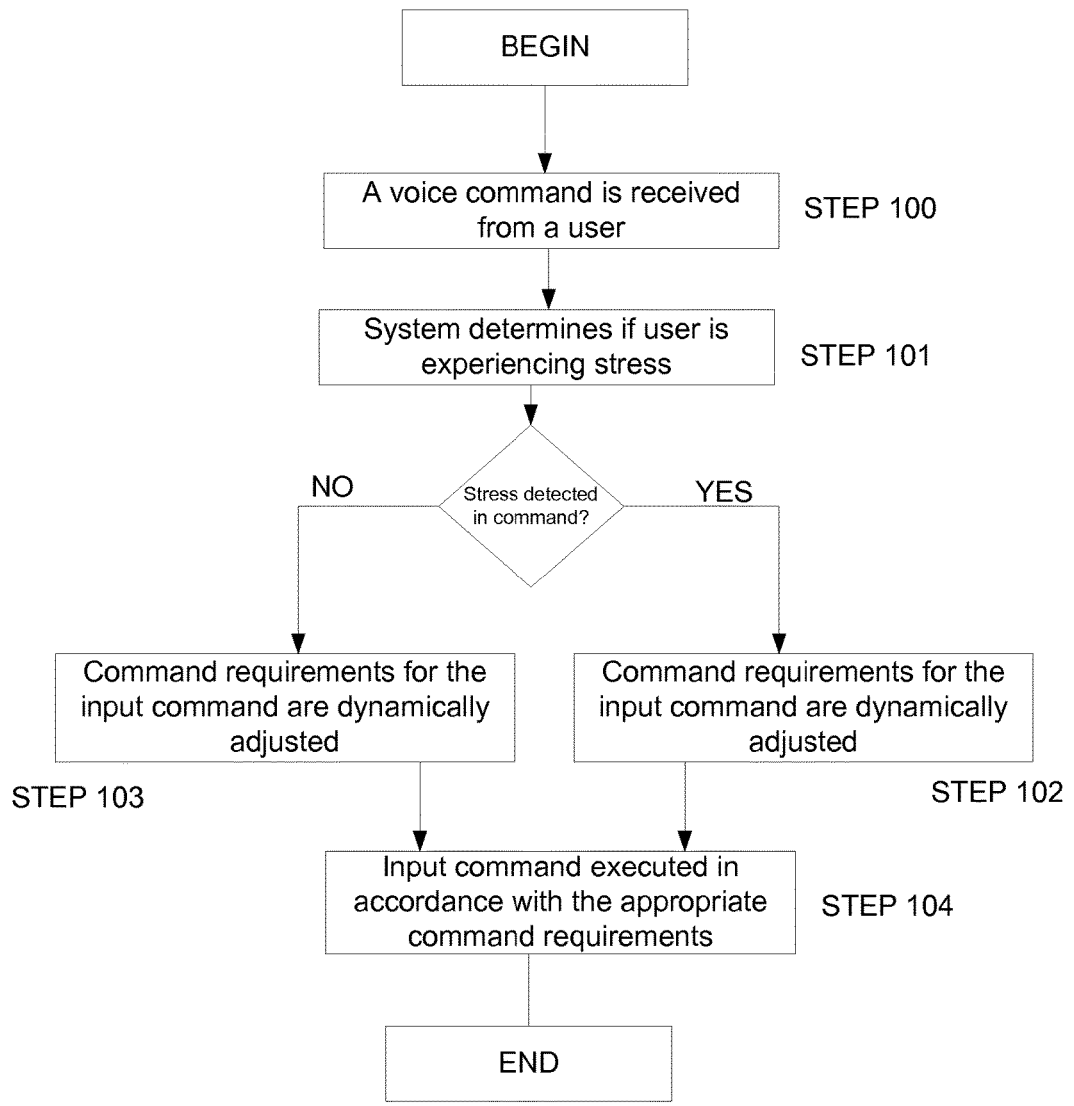

MODERATING SYSTEM RESPONSE USING STRESS CONTENT OF VOICE COMMAND

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention relates to software applications. More specifically, the present invention relates to the user experience with voice command software applications.

The distance between the human voice and computing systems is rapidly growing shorter. For example, speech recognition is a standard feature on most current mobile devices. The state of technology is such that there is very high accuracy in transcribing the human spoken word into an ASCII text representation on a mobile device or computer.

Voice based software applications are similarly becoming much more commonplace. Such commands can be found on mobile devices and computers, in automobiles, etc. In a voice command system or application, just as with mouse and keyboard inputs, some types of commands, for example, those that could result in destruction of data, or have patient safety implications, might warrant additional confirmation steps to ensure the user actually wishes to carry out the action, while other, non-destructive or non-safety related actions may not require such confirmations.

Studies have shown that under stress, user's ability to fully process a decision is impaired. In the healthcare environment, where decisions that are made may affect patient safety, the need to ensure that decisions made by a user take into consideration alternatives and potential negative affects is critical. As voice command applications become more prevalent in healthcare facilities, there exists a need to protect against the system responding to a decision made by a user under stress that may have catastrophic results.

As indicated above, systems may require a user to confirm command when the result of the command is deemed to require confirmation. There are currently no known systems that take into consideration the level of stress that the user may or may not be under when commanding the system to take such action.

In some of these situations, the ability to seamlessly and quickly bypass confirmations or quickly require additional confirmation may be desired or needed. There currently is no way for the system to adapt to the situation and to adjust the information it is asking of the user.

However, it could be argued that the amount of stress that the user is experiencing should perhaps act as a moderating variable in the equation, as high stress levels can potentially affect a users ability to effectively make decisions.

Therefore, there exists a need for a method for integrating a user's stress levels into a voice command system or application. This and other needs are addressed by one or more aspects of the present invention.

SUMMARY OF THE INVENTION

The present invention includes many aspects and features. Moreover, while many aspects and features are described in, the present invention is not limited to use only in the disclosed context, as will become apparent from the following summaries and detailed descriptions of aspects, features, and one or more embodiments of the present invention.

Accordingly, one aspect of the present invention relates to a computer implemented method for automatically moderating a system response to a user's voice command. A voice command from a user is received. The voice command is associated with a system command, the system command including command requirements. A determination is the made as to whether the user is experiencing stress based on a stress level detected in the received voice command, and the command requirements dynamically adjusted when the user is determined to be experiencing stress.

In a feature of this aspect, the stress level of the user using the received voice command is detected.

In another feature of this aspect, the system command is executed in accordance with the adjusted command requirements.

In another feature of this aspect, the system command is executed in accordance with the command requirements when the user is not experiencing stress.

In another feature of this aspect, the command requirement includes one or more of additional information, user confirmation, third-party confirmation.

In another feature of this aspect, the adjusted command requirement includes eliminating the command requirements from the command, such that the command is executed immediately.

In another feature of this aspect, the adjusted command requirement includes adding an additional command requirement to the command that must be performed in order for the command to be executed by the system.

Another aspect of the present invention relates to a computing device comprising a processor, the processor including a plurality of computer executable commands, the plurality of computer executable commands for implementing a method for automatically moderating a system response to a user's voice command. A voice command from a user is received. The voice command is associated with a system command, the system command including command requirements. A determination is the made as to whether the user is experiencing stress based on a stress level detected in the received voice command, and the command requirements dynamically adjusted when the user is determined to be experiencing stress.

In a feature of this aspect, the stress level of the user using the received voice command is detected.

In another feature of this aspect, the system command is executed in accordance with the adjusted command requirements.

In another feature of this aspect, the system command is executed in accordance with the command requirements when the user is not experiencing stress.

In another feature of this aspect, the command requirement includes one or more of additional information, user confirmation, third-party confirmation.

In another feature of this aspect, the adjusted command requirement includes eliminating the command requirements from the command, such that the command is executed immediately.

In another feature of this aspect, the adjusted command requirement includes adding an additional command requirement to the command that must be performed in order for the command to be executed by the system.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein, FIG. 1 is an example flow diagram of a disclosed implementation of a method for moderating system response to a user's voice command in accordance with the present invention.

DETAILED DESCRIPTION

Referring now to the drawings, one or more preferred embodiments of the present invention are next described. The following description of one or more preferred embodiments is merely exemplary in nature and is in no way intended to limit the invention, its implementations, or uses.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

As indicated above,

The disclosed method is implemented in an application (software) that comprises a set of machine readable code stored on a machine readable medium. The application is executed by a processor included in a computing device. The processor executes the disclosed application through a user interface (UI).

A computer implemented method for moderating system response to a user's voice command is disclosed. An application response module (ARM) is executed by a processor included in a computing device. The ARM is included in an application that allows a user to interact with the application using voice commands. In accordance with the disclosed implementation, the ARM moderates the application's response to the user's voice commands based on a determined stress level at the user.

The ARM interacts with a voice stress analysis (VSA) application to determine the user's stress level. Those having skill in the art should know that there are a number of VSA applications available that provide an output representative of the user's stress level based on, for example, the measurement of slight inaudible fluctuation in the human voice known as "micro tremors." The VSA application that is used for determining whether a user is experiencing stress is not germane to the disclosed implementation, and therefore any VSA may be used.

According to the disclosed implementation, the processor determines the stress level of the user and moderates the response to a voice command of the application being used by the user. The measured stress level by the processor may be used in a number of ways to moderate the response to the commands. As those having skill in the art know, applications may have numerous commands that require additional information or confirmations (command requirements) in order for the application to execute the command. In the disclosed implementation, the ARM may adjust the command requirements for an input voice command. For example, more or less additional confirmation(s) may be requested of the user, some commands could be completely blocked, or even additional users could be required for confirmation.

The amount of confirmation or additional information required of the speaker could be dynamically adjusted as the detected stress level changed. The directionality could be either way, in that for some types of tasks, high stress situations would cause the system to require more information from the speaker (or even prevent the action) and for other tasks, high stress situations would require less information the speaker. In addition to adjusting confirmations, the system may adjust the alternative or additional actions that it recommends to the user as well, e.g., suggesting additional actions in higher stress situations.

As an example of the disclosed implementation in a healthcare environment, suppose a healthcare provider needed to stop an order for a medication from being processed the system because the provider realized that there would be a patient safety issue if it proceeded. Due to the nature of the result if the patient were to receive the medication, the healthcare provider would like experience stress that would be detectable in the user's voice. As such, when the provider commands the system to stop, the ARM would detect the stress level in the provider's voice. As a result of this detection, the system may bypass the normal confirmation required to cancel an order (i.e., normal command requirements), and simply cancel the order immediately.

An example flow diagram of the disclosed method for moderating a system's response to a user's voice command is shown in FIG. 1. A user, currently using a voice command application, inputs a vocal command into the system. Step 100. The system receives the command, and determines whether the command by the user is made while the user is experiencing stress. STEP 101. If it is determined that the user is experiencing stress, the command requirements associated with the input command are dynamically adjusted based on the determined stress level. STEP 102.

If the user is not experiencing stress when the command was input, the command is executed in accordance with the initial command requirements. Step 103.

The input command is then executed in accordance with the appropriate command requirements. STEP 104.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A processor-based method for confirming voice commands, comprising:
   (a) receiving, at an electronic device via a microphone associated with the electronic device, a first utterance from a first healthcare provider representing a voice command for a first healthcare software application;
   (b) automatically processing the first utterance to determine if the first utterance is a voice command comprising a health order associated with the first healthcare software application for a patient;
   (c) electronically determining a stress level of the first healthcare provider using the processed first utterance via voice stress analysis to determine micro tremors in the first utterance;
   (d) transmitting a confirmation request to another healthcare provider if the electronically determined stress level is above a predetermined threshold;
   (e) receiving, at the electronic device from a second healthcare provider, a response to the transmitted confirmation request; and
   (f) executing the first voice command, based on the received response.

2. The processor-based method of claim 1, wherein the first voice command comprises an order associated with a medication.

3. The processor-based method of claim 1, wherein first healthcare software application comprises an application response module.

4. The processor-based method of claim 3, wherein the application response module interacts with the voice stress analysis software.

5. A non-transitory computer readable storage medium having data stored therein representing software executable by a computer, the software including instructions to confirm voice commands, the storage medium further comprising:
   (a) instructions for receiving, at an electronic device via a microphone associated with the electronic device, a first utterance from a first healthcare provider representing a voice command for a first healthcare software application;
   (b) instruction for automatically processing the first utterance to determine if the first utterance is a voice command comprising a health order associated with the first healthcare software application for a patient;
   (c) instructions for electronically determining a stress level of the first healthcare provider using the processed first utterance via voice stress analysis to determine micro tremors in the first utterance;
   (d) instructions for transmitting a confirmation request to another healthcare provider if the electronically determined stress level is above a predetermined threshold;
   (e) instructions for receiving, at the electronic device from a second healthcare provider, a response to the transmitted confirmation request; and
   (f) instructions for executing the first voice command, based on the received response.

6. The non-transitory computer readable storage medium of claim 5, wherein the first voice command is a voice command regarding an order.

7. The non-transitory computer readable storage medium of claim 5, wherein the first voice command is a voice command regarding a medication.

8. The non-transitory computer readable storage medium of claim 5, wherein first healthcare software application comprises an application response module.

9. The non-transitory computer readable storage medium of claim 8, wherein the application response module interacts with the voice stress analysis software.

\* \* \* \* \*